UNITED STATES PATENT OFFICE.

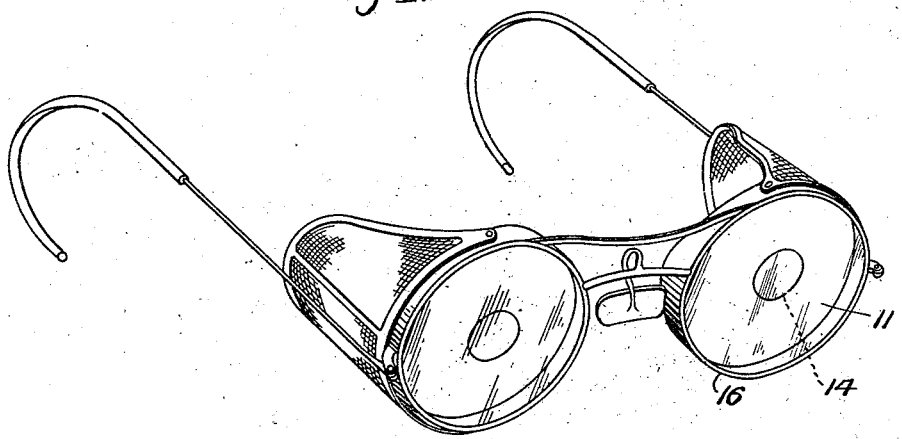
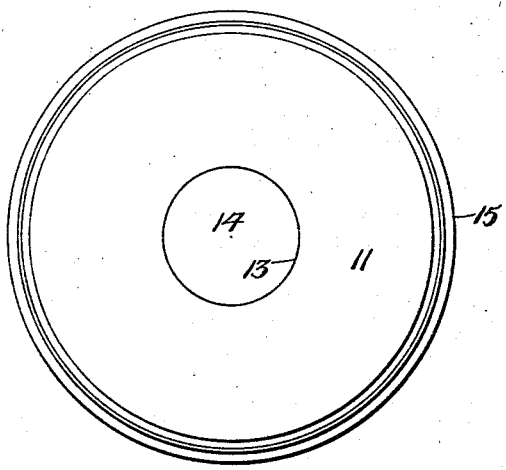
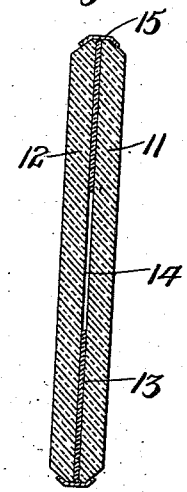

WALTER G. KING, OF NEW YORK, N. Y., ASSIGNOR TO JULIUS KING OPTICAL COMPANY, A CORPORATION OF NEW YORK.

EYE-PROTECTING GOGGLES.

1,285,226.  Specification of Letters Patent.  Patented Nov. 19, 1918.

Application filed September 13, 1917. Serial No. 191,153.

*To all whom it may concern:*

Be it known that I, WALTER G. KING, a citizen of the United States, residing at New York, in the county of New York and State of New York, have invented certain new and useful Improvements in Eye-Protecting Goggles, of which the following is a specification.

The principal object of my invention is to provide a new and improved protective device for the eyes of workmen in shops and other exposed places. Another object of my invention is to provide a transparent medium for a goggle that shall be adapted to resist fracture and protect the eyes from broken particles thereof. Still another object of my invention is to provide a "lens" for a protective goggle that shall not disintegrate when subjected to ordinary impact, as of flying bolts, etc. All these objects and others will be made apparent in the following specification and claims taken in connection with the accompanying drawings. In these drawings, I have illustrated one specific embodiment of my invention, but it will be understood that modifications can be made within the scope of the invention. In the following disclosure, I have reference particularly to the form of my invention shown in the drawings.

Figure 1 is a perspective view of the goggle embodying my invention;

Fig. 2 is a front elevation of the lens; and

Fig. 3 is a cross section of the same.

The goggle frame carries two lenses, each one of which comprises an outer plane glass disk 11 and an inner plane glass disk 12 with a celluloid annulus 13 between them, these parts being cemented firmly together. A metal band 15 around their edges is beaded down as shown in Fig. 3, and holds the parts more firmly together. Each of these lenses is mounted appropriately in the frame 16 of the goggle. The hole 14 in the celluloid annulus 13 is at the center in the line of most direct vision.

In putting goggles on workmen to protect their eyes from flying bolts or similar objects, they are liable to become apprehensive that such objects may break and shatter the glass lenses and that the glass getting in the eye is as much to be feared as the object which breaks the glass. If celluloid is substituted for glass, it has two disadvantages; first, it is not strong but could easily be broken through, and, second, it is not as clearly transparent as glass and its comparative opacity is objectionable. By my improved device, the glass is cemented to the celluloid so that, even if the outer glass disk 11 is broken, the fragments of glass remain in place cemented to the celluloid annulus 13. In most cases, the inner glass disk 12 will not be fractured, but even if a very excessive impact is given, sufficient to fracture the inner glass disk 12, its fragments will remain attached to the celluloid annulus 13.

As is well known, when glass is broken by impact, it breaks in long slender pieces radiating from the point of impact so that, even if the impact registers with the hole 14 in the annulus 13, the pieces of glass will extend from that point over the celluloid 13 and be held by their attachment thereto. Since the area of the hole 14 is only a small fraction of the area of the entire lens, the chances are small that an impact will occur over the hole.

It is well understood that any object at which one is looking with most interest will come in the direct line of vision and accordingly the direct gaze of the wearer of this goggle will always be through the opening 14 and not be subject to any obstruction by relatively opaque celluloid. The inner edge of the annulus 13 will be so close to the eye as to be entirely out of focus, and hence the wearer of the goggle will not be conscious of the dimming effect of the celluloid unless he turns his eye-balls so as to direct his gaze through the material of the annulus itself. Ordinarily, he will not do this and, if he does do it, it will be only for a moment to catch sight of an object of incidental interest.

Experience shows that these lenses are very rugged to resist fracture and scattering of particles of glass. Nevertheless, experience further shows that for all practical purposes they give as clear and effective transmission of light for vision as glass alone and that utility to the wearer is substantially the same.

It will be seen that it is not necessary that the glass members 11, 12 shall be plane, but either or both of them can be properly curved to afford correction for imperfect refraction in the eye of the wearer.

In the following claims, the word "disk"

is employed in a broad sense to include all varieties of lenses and is not to be understood as limited to having a circular outline. Also, I use the word "lens" in a broad sense to include any transparent or translucent medium to go before the eye, whether it is simple or composite and whether its faces be curved or plain.

I claim:—

1. A lens comprising two adjacent members cemented together, one superior to the other in transparency but inferior in a fracture resisting quality, said other member having a small opening therethrough to facilitate vision in a direction through said opening.

2. A lens comprising a glass disk and a celluloid annulus cemented together.

3. A lens comprising two glass disks and a celluloid annulus cemented between them.

4. A lens comprising two glass members and a perforated fracture resisting member cemented between them.

5. A lens comprising a continuous glass member and a discontinuous reinforcing member cemented thereto, said latter member being slightly inferior to the glass in transparency but its discontinuity affording a line of vision through the unobstructed glass.

WALTER G. KING.